United States Patent
Schmidtke et al.

(10) Patent No.: US 10,439,945 B2
(45) Date of Patent: Oct. 8, 2019

(54) SINGLE STREAM AGGREGATION PROTOCOL

(71) Applicant: TIONESTA, LLC, San Antonio, TX (US)

(72) Inventors: Jakub Schmidtke, San Antonio, TX (US); Nicholas Armstrong, San Antonio, TX (US)

(73) Assignee: TIONESTA, LLC, Austin, TX (US)

( * ) Notice: Subject to any disclaimer, the term of this patent is extended or adjusted under 35 U.S.C. 154(b) by 63 days.

(21) Appl. No.: 15/858,665

(22) Filed: Dec. 29, 2017

(65) Prior Publication Data

US 2019/0207859 A1 Jul. 4, 2019

(51) Int. Cl.
| | |
|---|---|
| G06F 11/00 | (2006.01) |
| H04L 12/859 | (2013.01) |
| H04L 12/807 | (2013.01) |
| H04L 12/865 | (2013.01) |
| H04L 12/863 | (2013.01) |
| H04L 12/855 | (2013.01) |
| H04W 28/02 | (2009.01) |

(52) U.S. Cl.
CPC .......... H04L 47/2475 (2013.01); H04L 47/27 (2013.01); H04L 47/6255 (2013.01); H04L 47/6275 (2013.01); H04L 47/2466 (2013.01); H04W 28/0215 (2013.01)

(58) Field of Classification Search
CPC . H04L 47/2475; H04L 47/6255; H04L 47/27; H04L 47/6275; H04L 47/2466; H04W 28/0215

USPC ....................................... 370/230, 235, 235.1
See application file for complete search history.

(56) References Cited

U.S. PATENT DOCUMENTS

| | | | |
|---|---|---|---|
| 10,243,859 B2 * | 3/2019 | Kutty ...................... | H04L 47/19 |
| 2005/0226150 A1 * | 10/2005 | Santos .................... | H04L 47/10 370/230 |
| 2006/0203730 A1 * | 9/2006 | Zur ......................... | H04L 47/10 370/235 |
| 2010/0034089 A1 * | 2/2010 | Kowali ............... | H04L 67/2842 370/235 |
| 2013/0083654 A1 * | 4/2013 | Lee ........................ | H04L 47/283 370/230 |
| 2013/0258846 A1 * | 10/2013 | Damola ................ | H04W 80/06 370/230 |

(Continued)

Primary Examiner — Chuong T Ho
(74) Attorney, Agent, or Firm — Osha Liang LLP

(57) ABSTRACT

A data transmission system includes a sending node, including a link queue storing data packets to be transmitted to a receiving node on a network link and a link-specific congestion control, associated with the link queue, the link-specific congestion control controlling a congestion window based on an available capacity of the network link to determine a size of the link queue for the data packets to be transmitted. The sending node further includes flow senders transmitting data packets of data flows to flow receivers on the receiving node, and flow-specific receive window controls, independent from the link-specific congestion control. One flow-specific receive window control is associated with each data flow, and each flow-specific receive window control controls a receive window of the associated flow sender based on an available capacity of the corresponding flow receiver to specify an amount of data available to be entered into the link queue.

21 Claims, 13 Drawing Sheets

(56) References Cited

U.S. PATENT DOCUMENTS

| | | | |
|---|---|---|---|
| 2015/0009817 A1* | 1/2015 | Sato | H04L 47/193 |
| | | | 370/230.1 |
| 2016/0212031 A1* | 7/2016 | Jain | H04L 43/0876 |
| 2016/0255005 A1* | 9/2016 | Ramaiah | H04L 47/12 |
| | | | 370/231 |
| 2016/0373361 A1* | 12/2016 | Dhanabalan | H04L 47/24 |
| 2017/0070444 A1* | 3/2017 | Dhanabalan | H04L 47/2441 |
| 2017/0346725 A1* | 11/2017 | Lapidous | H04L 1/16 |
| 2018/0176138 A1* | 6/2018 | Ramaiah | H04L 47/12 |
| 2018/0198721 A1* | 7/2018 | Odell | H04L 47/27 |
| 2018/0219780 A1* | 8/2018 | Agarwal | H04L 47/12 |
| 2018/0254990 A1* | 9/2018 | Ramaiah | H04L 47/27 |
| 2018/0343203 A1* | 11/2018 | Kutty | H04L 47/19 |
| 2018/0351867 A1* | 12/2018 | Dhanabalan | H04L 47/122 |
| 2018/0375775 A1* | 12/2018 | Xu | H04W 28/0273 |
| 2019/0020594 A1* | 1/2019 | Dhanabalan | H04L 47/2441 |

* cited by examiner

FIG. 7B

SINGLE STREAM AGGREGATION PROTOCOL

BACKGROUND

Communication protocols may be used for exchanging data, e.g., between a client and a server. Various implementations of transmission control protocols may be used to control how a sending node transmits one or more data flows to a receiving node. A transmission control protocol may, for example, ensure that data is reliably delivered from one application executing on one computing device to another application executing on another computing device, in an ordered manner over a data network.

SUMMARY

In general, in one aspect, one or more embodiments relate to a data transmission system comprising a sending node, comprising a first link queue, configured to store data packets to be transmitted to a receiving node on a first network link; a first link-specific congestion control, associated with the first link queue, the first link-specific congestion control configured to control a first congestion window, wherein the first congestion window, controlled based on an available capacity of the first network link, determines a size of the first link queue for the data packets to be transmitted; a plurality of flow senders, configured to transmit data packets of a plurality of data flows to flow receivers on the receiving node, a plurality of flow-specific receive window controls, independent from the first link-specific congestion control, wherein exactly one flow-specific receive window control is associated with each data flow of the plurality of data flows, wherein each flow-specific receive window control controls a receive window of the associated flow sender based on an available capacity of the corresponding flow receiver to specify an amount of data available to be entered into the first link queue.

In general, in one aspect, one or more embodiments relate to a method for transmitting data by a sending node, the method comprising setting a first link-specific congestion control associated with a first link queue, comprising: controlling a size of the first link queue associated with a first network link between the sending node and a receiving node, by setting a first congestion window based on an available capacity of the first network link, wherein the first link queue is configured to store data packets to be transmitted from the sending node to the receiving node; and setting a plurality of flow-specific receive window controls that are independent from the link-specific congestion control, comprising: for each of the plurality of flow-specific receive window controls, controlling a receive window of an associated flow sender of the sending node based on an available capacity of a corresponding flow receiver of the receiving node, wherein the flow-specific receive window specifies an amount of data available to be entered into the first link queue for transmission to the receiving node.

BRIEF DESCRIPTION OF DRAWINGS

FIGS. 7A and 7B show the use of single-stream aggregation protocols for spill-over scheduling, in accordance with one or more embodiments of the invention.

DETAILED DESCRIPTION

Figure 1:
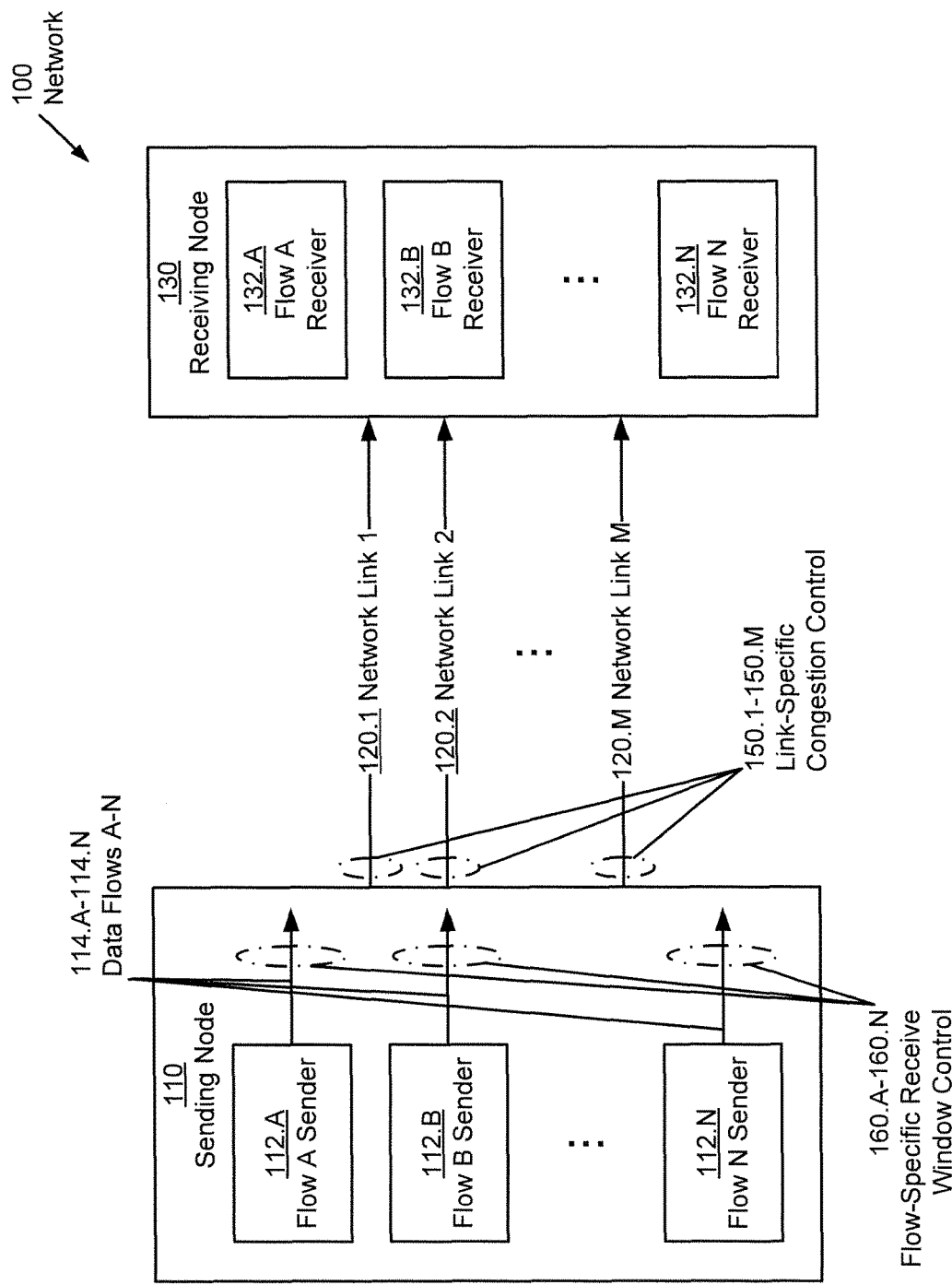
FIG. 1 shows data flows in a network, in accordance with one or more embodiments of the invention.

Specific embodiments of the invention will now be described in detail with reference to the accompanying figures. Like elements in the various figures are denoted by like reference numerals for consistency. Like elements may not be labeled in all figures for the sake of simplicity.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-9, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope of the invention should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In one or more embodiments of the invention, a single stream aggregation protocol is used for data transmissions, as subsequently described. FIG. 1 shows data transmissions in a network, in accordance with one or more embodiments of the invention.

FIG. 1 shows a network (100) in accordance with one or more embodiments of the invention. The network (100) may establish a physical or virtual connection between a sending node (110) and a receiving node (130). In one or more embodiments of the invention, the connection is formed by one or more network links (120.1-120.M). One or more segments of these network links may be part of a wide area network (WAN) (e.g., the Internet), whereas other segments may be part of a local area network (LAN). In one or more embodiments of the invention, a network link (120.1-120.M) includes a physical network connection, e.g., a physical medium that may be optical or electrical, or a combination thereof, i.e., including electrical and optical segments. The physical network connection may further include wireless segments, without departing from the invention. Each network link may include multiple segments with intermediate hops across network devices such as, for example, routers, switches, multilayer switches and/or other types of computing or network devices (not shown).

One or more protocol layers may be implemented on top of the physical network connection (layer 1). These layers may include a data link layer (layer 2, such as a media access control (MAC) layer), a network layer (layer 3, such as the Internet protocol), and/or other layers such as a transport layer (layer 4, for transmission of TCP segments and/or UDP datagrams).

When multiple network links (120.1-120.M) are relied upon for the communication between the sending node (110) and the receiving node (130), some segments of these multiple network links may use the same network infrastructure, whereas other segments may use different network infrastructure. Consider, for example, a scenario in which a software application on a smartphone needs to communicate with a remote server. Assume that the smartphone corresponds to the sending node (110) and that the remote server corresponds to the receiving node (130). The software application, to increase data throughput, uses the smartphone's wireless local area network (W-LAN) interface (e.g., a Wi-Fi interface) and the smartphone's cellular network interface (e.g., an LTE or a 3G interface) in parallel. Accordingly, a first network link (120.1) may be used for transmitting data to the remote server via the smartphone's W-LAN interface, and a second network link (120.2) may be used for transmitting data to the remote server via the smartphone's cellular interface, thus using different network infrastructure (i.e., the network components relied upon by the LAN interface and by the cellular network interface are different). Further assume that the remote server uses a single network interface to connect to the Internet. Accordingly, both network links also include segments that use the same network infrastructure (the interface from the Internet to the remote server), when transmitting data to the remote server. In the described example, other segments of the two network links may or may not use identical network infrastructure. For example, if the W-LAN and cellular network services are operated by different providers, it is likely that the network links include segments that are non-identical, because they are operated by different providers, each relying on its own infrastructure. The network links may further have different capacities. For example, the bandwidth of a Wi-Fi-based network link may be higher than the bandwidth of a 3G interface. Further, either network link may have one or more bottlenecks specific to that network link. For example, in W-LAN connections, the bottleneck may be caused by the segment between the device with the W-LAN interface and the internet service provider (ISP), e.g., because the data rate provided by the ISP is capped. Similarly, in cellular connections, the bottleneck may be caused by the wireless network link between the portable device and the base transceiver station due to bandwidth limitations of the used cellular communication standard, the signal strength, and/or other factors. Those skilled in the art will appreciate that the invention is not limited to a combination of a W-LAN-based network link and a cellular network-based link. For example, embodiments of the invention are equally applicable to scenarios in which a device uses a W-LAN-based network link only or a cellular network-based link only, network links of the same type that may be wired or wireless, etc.

Continuing with the discussion of FIG. 1, the sending node (110), in accordance with one or more embodiments of the invention, may be any type of computing device that communicates via a network link (120.1-120.M). The sending node (110) may be a mobile or a non-mobile device, similar to the computing device described with reference to FIG. 9. In one or more embodiments, the sending node (110) may include one or more flow senders (112.A-112.N). A flow sender may be, for example, an application or a service executing on the sending node (110). Each of those flow senders may transmit a data flow (114.A-114.N) to a corresponding flow receiver (132.A-132.N) of a receiving node (130), as further described below. The transmission of a flow may be initiated, for example, as a result of actions by a user operating the sending node (110), or for any other reason. The flows may be transmitted via one or more of the network links (120.1-120.M). A flow, in accordance with one or more embodiments of the invention, includes a sequence of data portions (e.g., bits, bytes, or data portions of any other length), which may be grouped in data packets as further described below.

The receiving node (130), in accordance with one or more embodiments of the invention, may be any type of computing device that communicates via one or more of the network links (120.1-120.M). The receiving node (130) may be a mobile or a non-mobile device, similar to the computing device described with reference to FIG. 9.

In one or more embodiments of the invention, the receiving node (130) is an aggregation server which acts as a proxy between the sending node (110) and a network (e.g., the Internet). The counterpart, an aggregation client (not shown), may be executing on the sending node (110). The aggregation client may be operating as a virtual network interface to interface with the flow senders (112.A-112.N). Alternatively, the combination of flow senders (112.A-112.N) may form the aggregation client. The aggregation client, in order to serve multiple devices, may also be hosted on a router to which multiple devices may connect. Data flows originating from multiple different devices may thus benefit from the single-stream aggregation protocol. If an aggregation server and an aggregation client are used, all data flows are transmitted between the same two endpoints (the sending and the receiving nodes (110, 130). Accordingly, at least some of the network links (120.1-120.M), or segments of the network links are shared between all data flows (114.A-114.N), although these data flows may be transmitted over many independent network links (120.1-120.M) in parallel. At the same time, multiple data flows (114.A-114.N) may be transmitted over the same network link.

To regulate the distribution of data flows (114.A-114.N) over network links (120.1-120.M), link-specific congestion controls (150.1-150.M) may be implemented, as further described below. Those skilled in the art will appreciate that while FIG. 1 shows a configuration in which all the data flows are directed to flow receivers (132.A-132.N) of the receiving node (130), in other scenarios, one or more of the flows may be directed to other flow receivers that are not part of the receiving node (130).

In one or more embodiments of the invention, a link-specific congestion control (150.1-150.M) is implemented separately for each network link (120.1-120.M). Each link-specific congestion control may determine the capacity of the network link that the link-specific congestion control is associated with, and may make this capacity available to the data flows (114.A-114.N). Thus, data from different flows may be scheduled between available network links (120.1-120.M), based on the capacity of these network links, as determined by the link-specific congestion controls (150.1-150.M) associated with these network links (120.1-120.M). A detailed description of the link-specific congestion controls is provided below with reference to FIG. 2.

In one or more embodiments of the invention, a flow-specific receive window control (160.A-160.N) is implemented for each data flow (114.A-114.N). The flow-specific receive window controls (160.A-160.N) may ensure, separately for each data flow (114A-114.N), that data are sent at a rate that the corresponding flow receivers (132.A-132.N) are able to process. Because flow receivers (132.A-132.N) may have different buffer sizes and may be capable of accepting incoming data packets in data flows at different rates, the receive window controls are flow-specific and are not affected by the choice of the network links (120.1-120.M) that are being relied upon by a data flow. A detailed description of the flow-specific receive window control is provided below with reference to FIG. 2.

Figure 2:
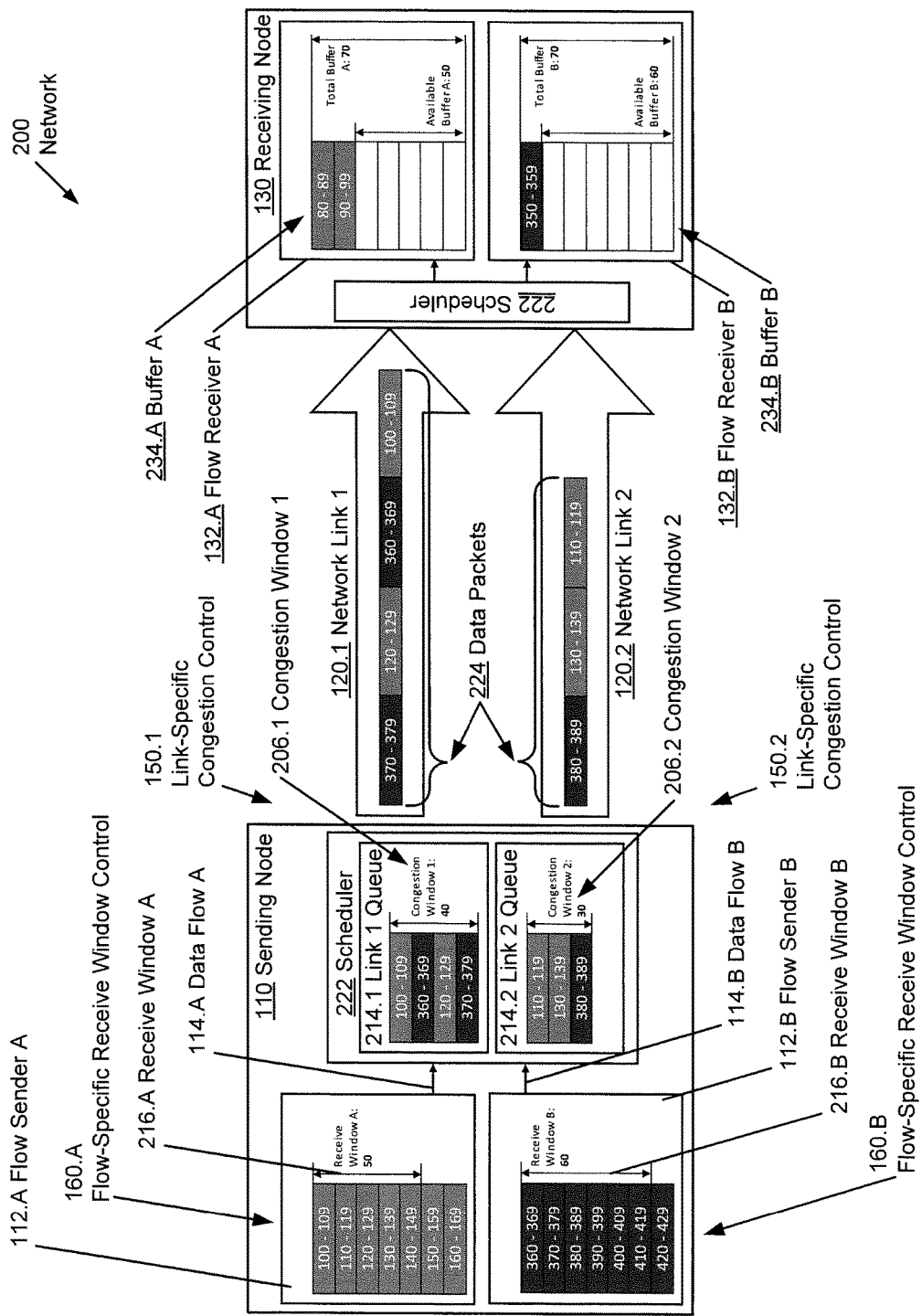
FIG. 2 shows an exemplary transmission of data packets of two data flows over two network links, in accordance with one or more embodiments of the invention.

FIG. 2 shows an exemplary transmission of data packets of two data flows over two network links, in accordance with one or more embodiments of the invention. Two data flow senders, A and B (112.A, 112.B), transmit data of two data flows, A and B (114.A, 114.B), via the two network links, network link 1 and network link 2 (120.1, 120.2). The data obtained from the data flow senders may be transmitted as data packets that may include any number of data portions.

In the example shown in FIG. 2, a data packet includes ten data portions, e.g., ten bytes. Data flow A (114.A) originates from flow sender A (112.A) and is received by flow receiver A (132.A). Similarly, data flow B (114.B) originates from flow sender B (112.B) and is received by flow receiver B (132.B). Flow-specific receive window controls (160.A, 160.B) are separately implemented for data flows A and B, as subsequently described. Further, link-specific congestion controls (150.1, 150.2) are separately implemented for network links 1 and 2 (120.1, 120.2), as subsequently described.

The link-specific congestion controls (150.1, 150.2) associated with the network links (120.1, 120.2) may regulate the data flow over the network links using congestion windows (206.1, 206.2). If a network link becomes slower or more congested, the size of the associated congestion window may be reduced, thus resulting in the acceptance of fewer data packets from the data flows. If other network links are not affected by the slowdown, more data packets of the data flows may be assigned to these other network links.

In FIG. 2, a scheduler (222) is used to separately control the transmission of data packets over the network links 1 and 2 (120.1, 120.2), thus implementing link-specific congestion controls (150.1, 150.2), in accordance with one or more embodiments of the invention. The scheduler (222) includes a scheduler component on the sending node (110) side and a scheduler component on the receiving node (130) side. The scheduler (222) may monitor the delivery of data packets to the receiving node (130) but does not distinguish between data packets directed to flow receivers A and B (132.A, 132.B), in accordance with one or more embodiments of the invention. The scheduler component on the receiving node may acknowledge received data packets and may perform re-ordering of received data packets on a per-flow basis, if necessary. As data packets (224) are delivered over the network links (120.1, 120.2), capacity becomes available, on the network links, to accommodate additional data packets to be transmitted via the network links. The scheduler (222) maintains, separately for each network link, a queue (214.1, 214.2), in which data packets, provided by the flow senders A and B (112.A, 112.B), are stored, in accordance with one or more embodiments of the invention. The number of data packets that may be transferred from the queues (214.1, 214.2) onto the network links (120.1, 120.2) may be controlled by congestion windows (206.1, 206.2). Only data packets that fit into the congestion windows may be transferred to the network links (120.1, 120.2).

The congestion window (206.1, 206.2) of each queue (214.1, 214.2) is regulated by a scheduler (222) component of the sending node (110), based on acknowledgements obtained from the receiving node (130). The scheduler component (222) on the receiving node (130) side is responsible for acknowledging received data packets as further described with reference to FIGS. 3A-6. Alternatively, the scheduler component (222) on the receiving node (130) side may also set the congestion windows (206.1, 206.2) of the queues (214.1, 214.2) on the sending node (110) side. In the exemplary scenario of FIG. 2, the scheduler (222) on the sending node (110) side determines that network link 1 (120.1) has capacity for 40 data portions (four data packets). Accordingly, the congestion window 1 (206.1) is set to 40, and 40 data portions may thus be transferred to network link 1. The scheduler further determines that network link 2 (120.2) has capacity for 30 data portions (three data packets). Accordingly, the congestion window 2 (206.2), on the sending node (110) side is set to 30, and 30 data portions may thus be transferred onto network link 2. The scheduling of available capacity of the network links (120.1, 120.2) is performed independent from whether the data packets (224) originate from flow sender A (112.A) or flow sender B (112.B), in accordance with one or more embodiments of the invention. Accordingly, a mix of data packets, some originating from flow sender A and some originating from flow sender B, may be transmitted via each of the network links (120.1, 120.2).

In one or more embodiments, the scheduler (222) may further maintain a re-transmit queue (not shown). The re-transmit queue may be occupied by data packets that need to be re-transmitted, as discussed below with reference to FIGS. 5A and 5B. Unlike the queues (214.1, 214.2) which are link-specific, the re-transmit queue is global, i.e., it may store data packets for any network link, and for any flow.

In FIG. 2, two data flows (114.A, 114.B) are separately controlled by flow-specific receive window controls (160.A, 160.B), in accordance with one or more embodiments of the invention. Data flow A (114.A) is received by flow receiver A (132.A), which includes a buffer A (234.A). Buffer A is configured to accommodate up to 70 data portions (seven data packets). As shown in FIG. 2, currently buffer A (234.A) is occupied by only 20 data portions, thus having sufficient capacity for another 50 data portions. Accordingly, the size of receive window A (216.A) is set to 50. 50 data portions may thus be provided by flow sender A (112.A), to be added to the queues (214.1, 214.2) of network links 1 and 2. Further, data flow B (114.B) is received by flow receiver B (132.B), which includes a buffer B (234.B). Buffer B is configured to accommodate up to 60 data portions. As shown in FIG. 2, currently buffer B (234.B) is occupied by only 10 data portions, thus having sufficient capacity for another 60 data portions. Accordingly, the size of receive window B (216.B) is set to 60. 60 data portions may thus be provided by flow sender B (112.B), to be added to the queues (214.1, 214.2) of network links 1 and 2.

The implementation of flow-specific receive window controls (160A, 160B) and link-specific congestion controls (150.1, 150.2) is described below with reference to FIGS. 3-6.

Figure 3A:
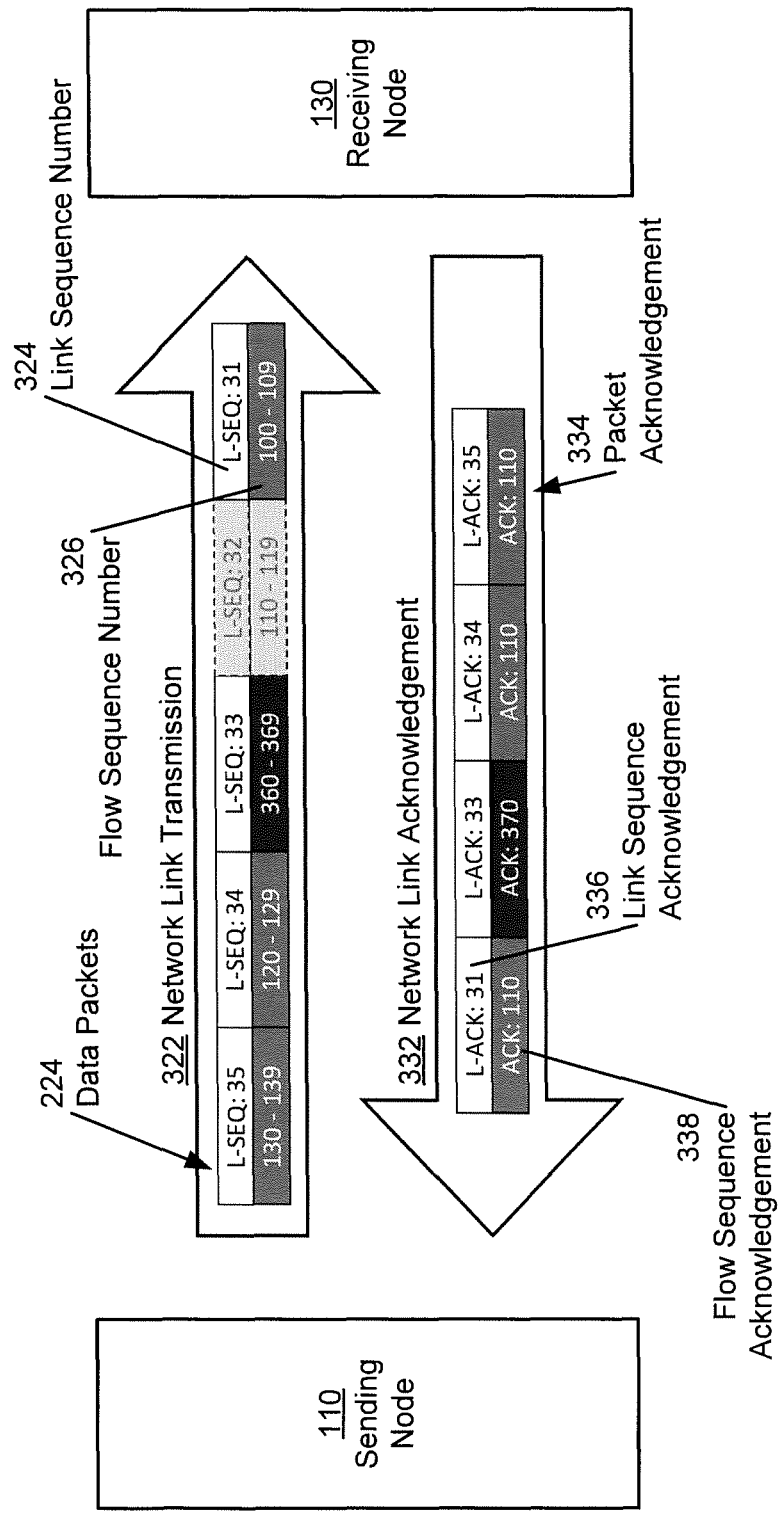
FIGS. 3A and 3B show an exemplary transmission of data packets including acknowledgments of received data packets, in accordance with one or more embodiments of the invention.
Figure 3B:
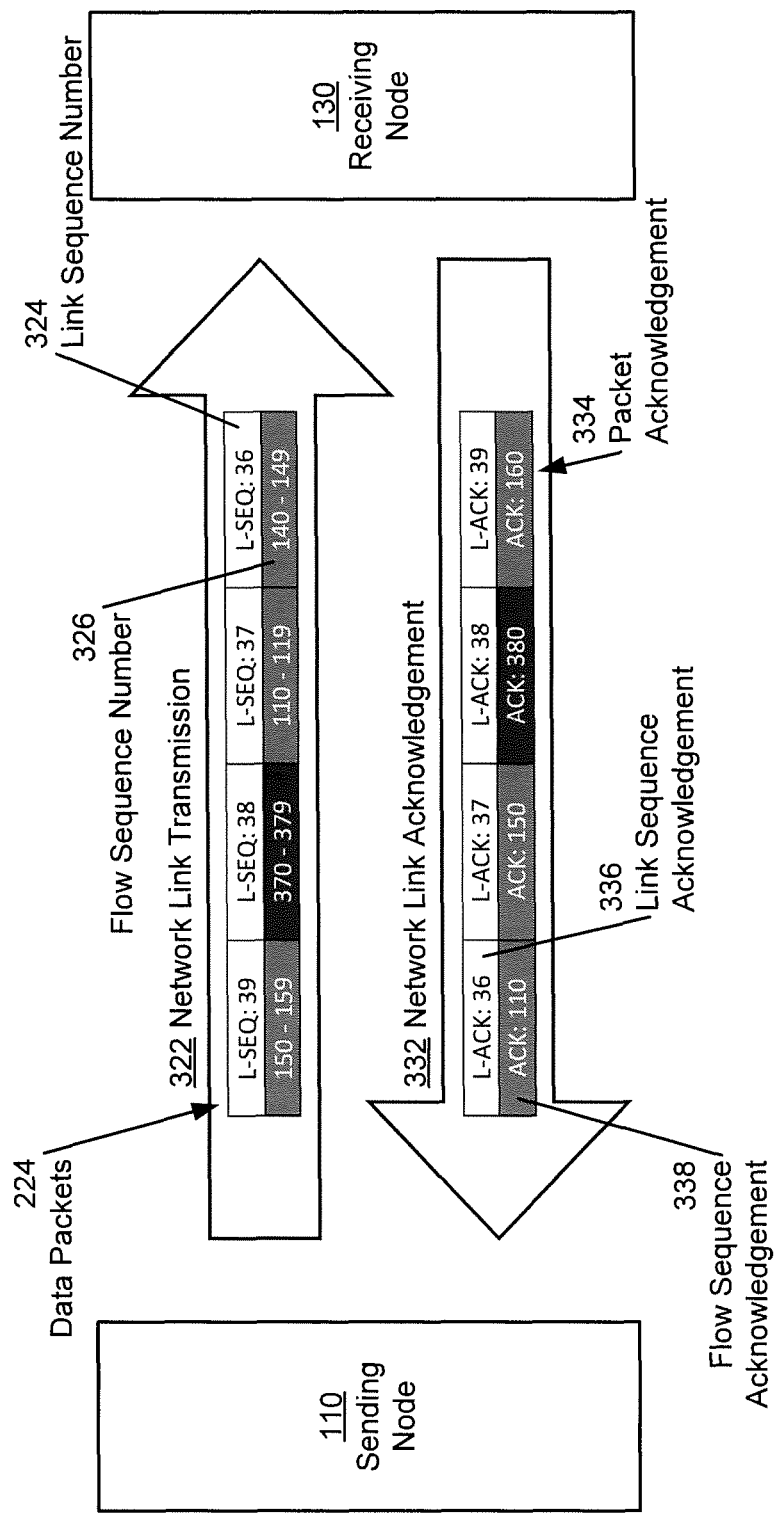

FIGS. 3A and 3B show an exemplary transmission of data packets including acknowledgments of received data packets using per-link sequence numbers and per-flow sequence numbers, in accordance with one or more embodiments of the invention. The flow sequence numbers may be used for flow-specific purposes, whereas the link sequence numbers may be used for link-specific purposes. More specifically, flow sequence numbers may be used to acknowledge in-order delivery of data packets. They may further be used to control the size of the receive window, separately for each flow. The separation of receive windows for different flows may prevent slow flows (e.g., flows with a slow flow receiver or with slower further network hops, beyond the aggregations server) from slowing down other flows that could otherwise operate faster. The flow sequence numbers, in accordance with one or more embodiments of the invention, are however not used by the link-specific congestion control. Instead, the link specific congestion control may rely on the link sequence numbers. In one or more embodiments of the invention, each data packet is, therefore, accompanied by a flow-specific flow sequence number and a link specific link sequence number, as shown in FIGS. 3A and 3B.

FIGS. 3A and 3B show the transmission of data packets in accordance with one or more embodiments of the invention, from a sending node (110) to a receiving node (130). FIG. 3A shows a first transmission including acknowledgements of the transmission, and FIG. 3B shows a second transmission that follows the first transmission. The transmissions in FIGS. 3A and 3B include data packets associated with two different data flows, and the transmissions are performed over a single network link. Rightward-directed arrows in FIGS. 3A and 3B indicate network link transmissions (322). In FIG. 3A, 50 data portions arranged in data packets (224), each including 10 data portions carrying a payload (not shown), are transmitted. A link sequence number (324) and flow sequence numbers (326) are assigned to each data packet (224). Leftward-directed arrows indicate network link acknowledgements (332) of received data packets, sent by the receiving node (130), to the sending node (110). Each packet acknowledgement (334) includes a link sequence acknowledgement (336) and a flow sequence acknowledgement (338). Alternatively, a packet acknowledgement (334) may include a link sequence acknowledgement (336) only.

Each data portion is assigned a flow sequence number (326). As illustrated in FIG. 3A, the first set of 10 data portions (first data packet) are assigned the flow sequence numbers (326) 100-109. The next set of 10 data portions (second data packet) are assigned the flow sequence numbers (326) 110-119, etc. These flow sequence numbers (326) remain valid, even in case of a retransmission, as further discussed below.

Each data packet is further assigned a link sequence number (324). Link sequence numbers are assigned independent from the data flows that pass the network link. Further, regardless of the size of a data packet, a single link sequence number is always assigned to a single data packet. If a data packet needs to be retransmitted (e.g., due to a packet loss or due to timeout), a new link sequence number will be assigned to the retransmitted packet. Accordingly, link sequence numbers may not be reused, unless the range of available link sequence numbers has been exhausted, and a loop-around of the link sequence numbers therefore occurs.

As previously noted the received transmissions of data portions in data packets are acknowledged using packet acknowledgements. Consider the network link transmission (322) and the network link acknowledgement (332) in FIG. 3A. In the network link transmission (322), five data packets (224) are transmitted. These data packets have flow sequence numbers (326) 100-109, 110-119, 360-369, 120-129 and 130-139, with the flow sequence numbers uniquely identifying data portions in a flow-specific manner. Only the first data portion of a data packet may be labeled. The flow sequence numbers of subsequent data portions in a data packet may be calculated based on the location of the data portions in the data packet. Accordingly, the flow sequence numbers that are included in the exemplary transmission of FIG. 3A may be 100, 110, 360, 120 and 130. Assume that the data packet with flow sequence numbers 360-369 belongs to data flow B (114.B) of FIG. 2, whereas all other data packets belong to data flow A (114.A) of FIG. 2. The consecutive link sequence numbers (324) 31-35 are assigned to the data packets (224) of the network link transmission (322). The network link acknowledgement (332), by the receiving node (130), to the sending node (110), includes packet acknowledgements (334) for data packets sent during the previously discussed network link transmission. A packet acknowledgement (334) of a data packet may include a flow sequence acknowledgement (338) and a link sequence acknowledgement (336). The link sequence acknowledgement includes the link sequence number that, in the network link transmission (322), was assigned to the data packet being acknowledged. The flow sequence acknowledgement (338) may include the last orderly received data portion+1 within that flow, thus indicating the next expected data portion. Alternatively, a packet acknowledgement (334) may not include a flow sequence acknowledgement (338). In FIG. 3A, consider, for example, the first acknowledgement in the sequence of the network link acknowledgements. This acknowledgement is provided by the receiving node, in response to the receipt of the data packet associated with the link sequence number 31 and the flow sequence numbers 100-109. Accordingly, the acknowledgement includes the link sequence acknowledgement 31 and the flow sequence acknowledgement 110.

In the network link acknowledgement (332), the data volume required for the transmission of acknowledgements may be reduced in various ways by including acknowledgements for multiple received data packets in a single packet acknowledgement. Rather than providing the complete link sequence number of each packet to be acknowledged, the additional link sequence numbers to be included in a single packet acknowledgement may be provided, e.g., as a sorted list, represented by offsets from the first fully provided link sequence number in the packet acknowledgement. These offsets may enable a more compact representation, in comparison to sending the link sequence numbers of all data packets to be acknowledged. Alternatively, a link sequence acknowledgement may include a first link sequence number and a last link sequence number, indicating a sequence of consecutively received data packets associated with the first link sequence number, the last link sequence number, and all link sequence numbers in between. Further, a link sequence acknowledgement may include a first or a last link sequence number and a series of offsets that indicate received and non-received data packets. For example, the link sequence acknowledgement "1200, 10, 5, 10" may indicate that following the link sequence number 1200, ten data packets were received, five data packets were not received, and ten data packets were again received. In other words, data packets associated with the link sequence numbers 1200-1210 were received, data packets associated with the link sequence numbers 1211-1215 were not received, and data packets associated with the link sequence numbers 1216-1225 were received.

Note that the network link acknowledgement (332) includes packet acknowledgements (334) for only four data packets, although five data packets (224) were sent in the network link transmission (322). Assume that the second transmitted data packet (link sequence number 32 and flow sequence number 110-119) is lost. Accordingly, the acknowledgement of the first data packet (link sequence acknowledgement "31", flow sequence acknowledgement "110") is followed by an acknowledgement of the third data packet (link sequence acknowledgement 33, flow sequence acknowledgement 370), while there is no acknowledgement for the second data packet (link sequence acknowledgement 32, flow sequence acknowledgement 120). Further note that, for all subsequently acknowledged packets associated with the data flow A (114.A), the flow sequence acknowledgement remains 110, because the data portion with the flow sequence number 110 is the next expected data portion of flow 1.

The sending node (110), receiving the network link acknowledgements (332) thus knows that all packets of data flow B (114.B) were successfully delivered, whereas the packet with the flow sequence numbers 110-119 and the link sequence number 32 of flow A (114.A) was lost. The sending node may detect missing acknowledgements by comparing the received packet acknowledgements against the previously transmitted packets, e.g., based on the received link sequence acknowledgements (336). with stored link sequence numbers and flow sequence numbers of the previously transmitted data packets. Despite the loss of a data packet of data flow 1, retransmission of data packets of data flow B can therefore be avoided.

FIG. 3B shows a second network link transmission, following the first network link transmission shown in FIG. 3A. Similar to the first network link transmission, the second network link transmission (322) includes data packets (224), each of which is accompanied by a link sequence number (324) and a flow sequence number (326). The first transmitted data packet (224) is associated with the flow sequence numbers (326) 140-149, and the link sequence number (324) 36. However, note that the first packet acknowledgement (334) includes the link sequence acknowledgement (336) 36 and the flow sequence acknowledgement (338) 110, because the data portions with the flow sequence numbers 110-119 have still not been provided.

The second transmitted data packet (224) is associated with the flow sequence number (326) 110-119, and the link sequence number (324) 37. This data packet (224) is a re-transmission, by the sending node (110), of the initially lost data packet. Accordingly, the second packet acknowledgement (334) includes the link sequence acknowledgement (336) 37 and the flow sequence acknowledgement (338) 150, because the data portions with the flow sequence numbers 110-119 has now been provided, and in addition, the data portions with the flow sequence numbers 120-149 have also already been provided and acknowledged. The two subsequently transmitted data packets are successfully received by the receiving node, and packet acknowledgements are returned to the sending node, accordingly.

Figure 4:
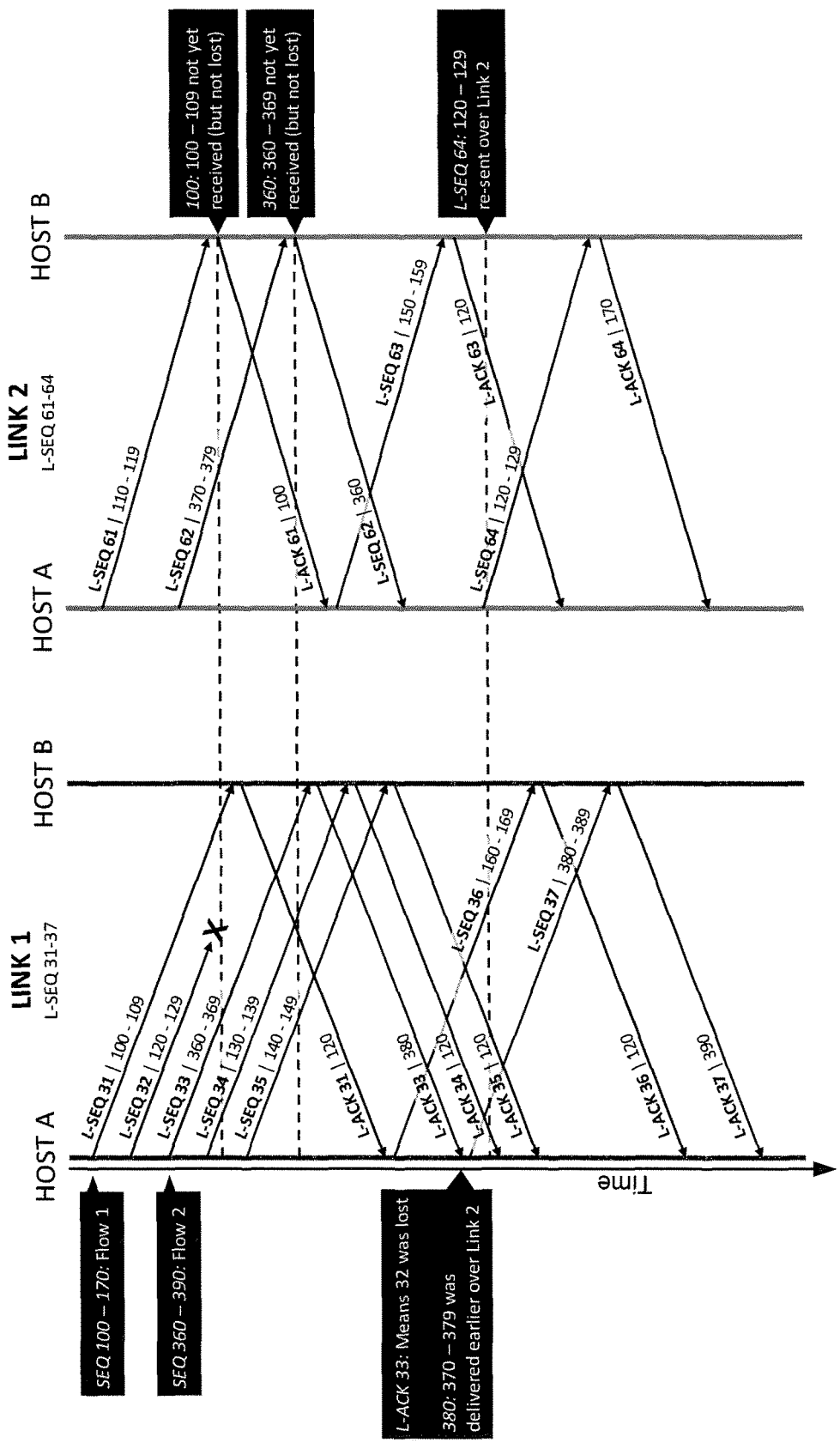
FIG. 4 shows an exemplary transmission of data packets over two network links, including acknowledgments of received data packets, in accordance with one or more embodiments of the invention.

FIG. 4 shows an exemplary transmission of data packets over two network links, including acknowledgments of received data packets, in accordance with one or more embodiments of the invention. FIG. 2, thus, illustrates how embodiments of the invention, initially discussed for a single network link with reference to FIGS. 3A and 3B, generalize to multi-link scenarios.

In FIG. 4, two data flows (flow 1, flow 2) are transmitted using two network links (link 1 and link 2). In the diagram flow 1 uses sequence numbers starting at 100, and flow 2 uses sequence numbers starting at 360. These sequence numbers, in accordance with one or more embodiments of the invention, are independent and the sequence numbers of flow 1 may eventually reach or exceed the sequence numbers of flow 2, and vice versa. The diagram presents the order of operations happening at both hosts (sending host A, receiving host B), with time progressing in a vertical downward direction. The same timeline applies to the transmissions over links 1 and 2.

In the exemplary transmission, data packets of flow 1 are sent—one data packet with flow sequence numbers 100-109 over link 1, and one data packet with flow sequence numbers 110-119 over link 2. The next data packet sent over link 1 (flow sequence numbers 120-129) is lost. Subsequently, data packets of the second flow (flow sequence numbers 360-369 and 370-379) are sent over links 1 and 2, respectively, etc.

Note that when the data packet with link sequence number 61 (data sequence numbers 110-119) is delivered over link 2, an acknowledgement is generated. The acknowledgement includes the link sequence acknowledgement 61, and the flow sequence acknowledgement 100, because the data packet with flow sequence numbers 100-109 sent over link 1 has not yet been received (see topmost dashed horizontal line, indicating the time at which the flow sequence acknowledgement is sent). This does, however, not necessarily indicate that a data packet has been lost. Similarly, the acknowledgement in response to the data packet with link sequence number 62 only acknowledges delivery of data packets of the second flow up to flow sequence number 360 because the data packet with flow sequence numbers 360-369 has not yet been received (see center dashed horizontal line, indicating the time at which the flow sequence acknowledgement is sent).

On link 1, when the data packet with link sequence number 31 is delivered, an acknowledgement is generated for link sequence number 31, and data portions up to 120—because the data packet with data portions 110-119 was received earlier.

The data packet with link sequence number 32 is lost. Host A learns about the lost data packet when it receives an acknowledgement for a data packet with link sequence number 33, without seeing an acknowledgement for the data packet with link sequence number 32. The link sequence acknowledgement 33 confirms delivery of data portions from the second flow up to flow sequence number 380 and thus confirms receipt of data portions associated with the flow sequence numbers 360-369 over link 1 and data portions associated with the flow sequence numbers 370-379 over link 2. In response, host A proceeds with sending another data packet of the second flow (link sequence number 37, flow sequence numbers 380-389). Further, host A is aware of the need to retransmit the previously lost data packet (flow sequence numbers 120-129). Host A thus sends this data packet over link 2, using link sequence number 64. Alternatively, host A could have chosen to re-transmit the lost data packet over link 1, using, for example, link sequence number 38.

When host B receives the data packet associated with link sequence number 64, it acknowledges the data packet. Note that the flow 1 data packets up to flow sequence number 170 are acknowledged, because after the receipt of re-transmitted data packets 120-129, all flow 1 data packets up to flow sequence number 170 have been received.

In the above example, due to the use of a combination of flow sequence numbers and unique link sequence numbers, only the lost data packet was re-transmitted, without unnecessarily re-transmitting other data packets. Further the above example illustrates the possibility of spontaneous data packet rescheduling over multiple links (although the lost data packet was originally transmitted over link 1, the re-transmission occurred over link 2 because link 2 turned out to be available for transmission of a data packet). This feature is enabled by the unique link sequence numbers (i.e., link sequence numbers that are not reused). The availability of a link may be regulated by the link specific congestion control, previously discussed with reference to FIGS. 1 and 2. For example, if a link suddenly becomes slower and starts dropping data packets, its congestion window will quickly shrink, and lost packets will be immediately sent over different links that did not experience slowdown.

Figure 5A:
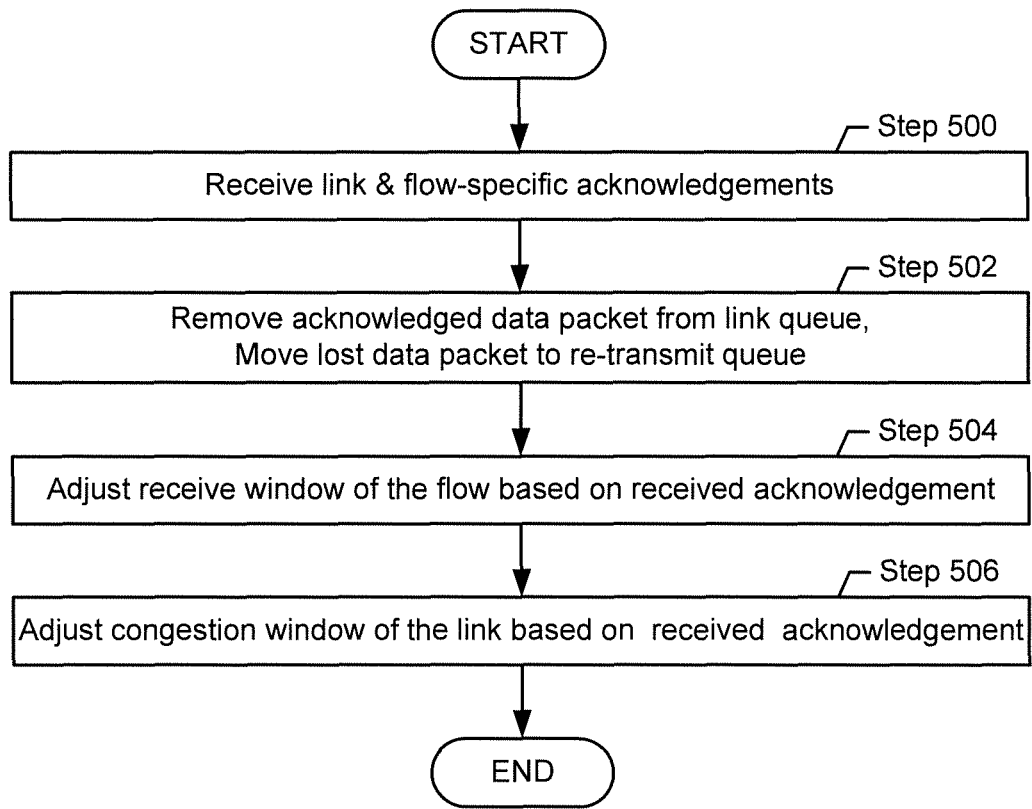
FIGS. 5A and 5B show methods for transmitting data packets by a sending node, in accordance with one or more embodiments of the invention.
Figure 5B:
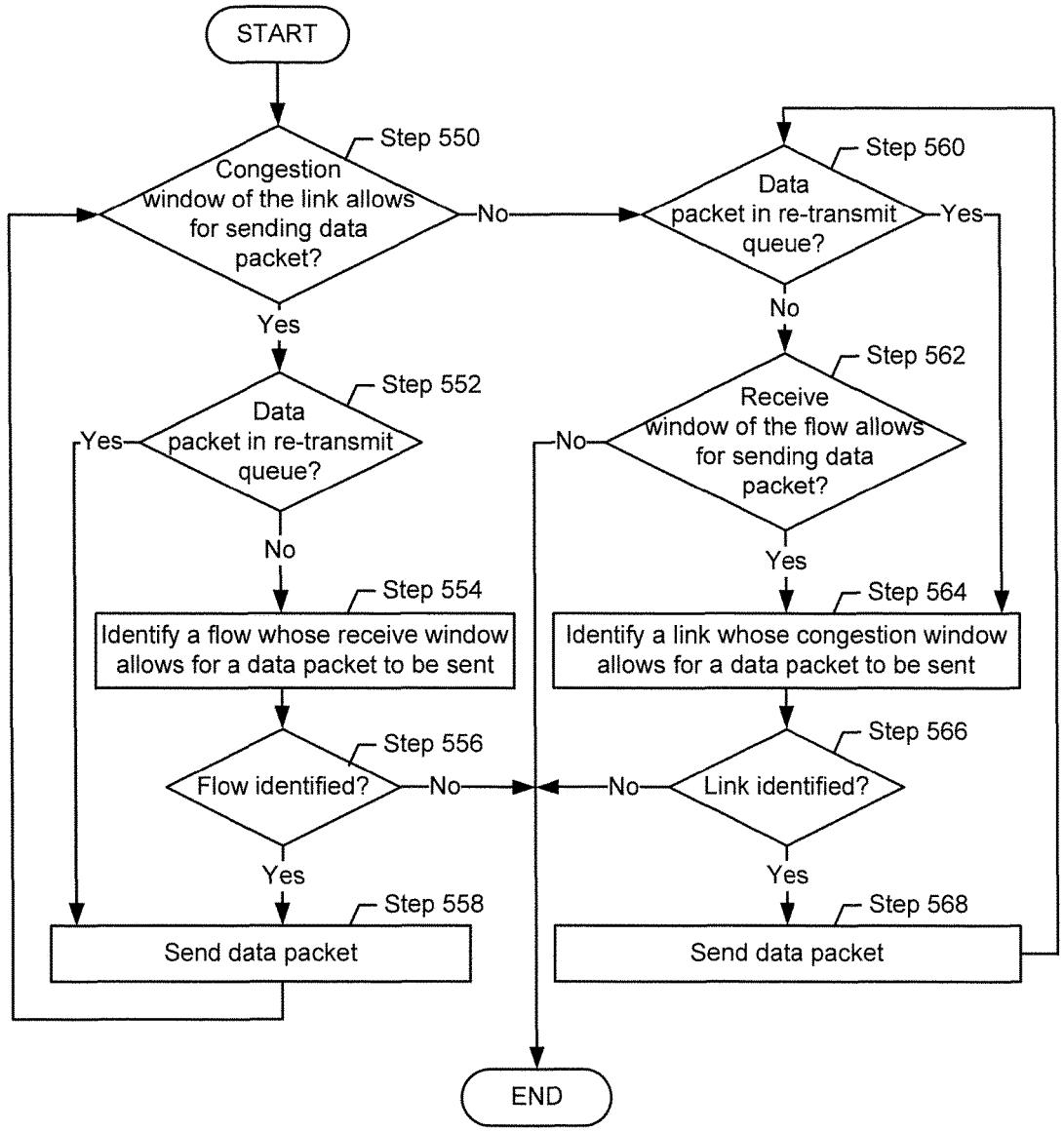
Figure 6:
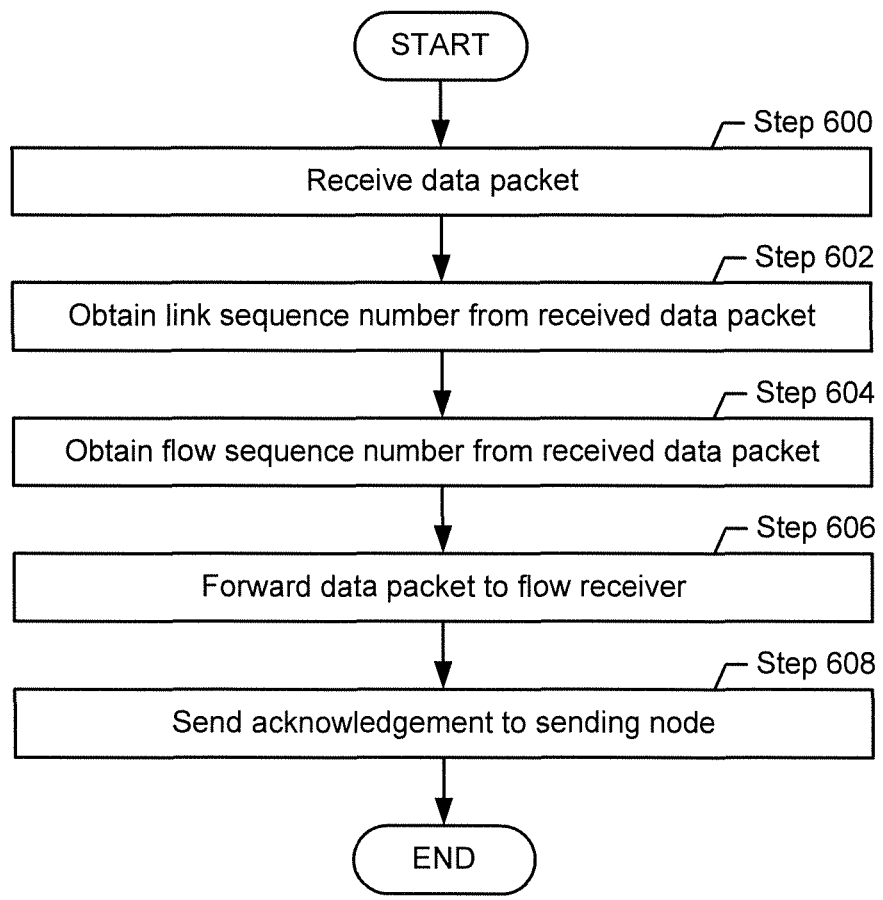
FIG. 6 shows a method for receiving data packets by a receiving node, in accordance with one or more embodiments of the invention.

FIGS. 5A-6 show flowcharts in accordance with one or more embodiments of the invention.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 5A-6 may be performed in parallel with any other steps shown in FIGS. 5A-6 without departing from the invention.

FIG. 5A shows a method for transmitting data packets by a sending node, in accordance with one or more embodiments of the invention. More specifically, the method of FIG. 5A may be used to adjust, on the sending node, receive windows associated with data flows and congestion windows associated with network links. The method of FIG. 5A may be repeatedly executed in order to detect and process packet acknowledgements provided by the receiving node.

In Step 500, a packet acknowledgement is received. The packet acknowledgement includes a flow-specific flow sequence acknowledgement and a link-specific link sequence acknowledgement, as previously discussed with reference to FIGS. 3A, 3B and 4. Alternatively, the packet acknowledgement may include a link-specific link sequence acknowledgement only. The packet acknowledgement may have been sent by a receiving node, as described in Step 608 of FIG. 6.

In Step 502, the acknowledged data packet, based on the packet acknowledgement, is removed from the link queue that was used to transmit the data packet. Further, if it is determined that there are other, non-acknowledged data packets in the link queue (or any of the link queues), the non-acknowledged packet may be moved to the re-transmit queue. A data packet may be considered lost, based on various criteria. For example, as previously discussed with reference to FIGS. 3A, 3B and 4, a data packet may be considered lost, if a packet acknowledgement is received for one data packet sent over a network link, but no acknowledgement was received for an earlier data packet sent over the network link. In addition or alternatively, a timeout criterion may be implemented, such that a data packet is considered lost if no packet acknowledgement for that data packet is received within a specified time window. Causes for lost data packets include, but are not limited to, loads on network links that exceed the capacity of the network link and transmission delays.

In Step 504, the receive window of the data flow with which the packet acknowledgement that was received in Step 500 is associated is adjusted. The adjustment may be performed, for example, based on information provided by the receiving node regarding the capacity of the flow receiver buffer. Although the buffer may have a known total capacity, the available buffer may be different and may be communicated to the sending node to adjust the receive window of the corresponding flow sender.

In Step 506, the congestion window of the network link with which the packet acknowledgement that was received in Step 500 is associated is adjusted. The adjustment is performed independent from the adjustment of the receive window, in accordance with one or more embodiments of the invention. A congestion control algorithm may be used to determine the size of the congestion window. Various congestion control algorithms may be used, without departing from the invention. For example, a congestion control algorithm similar to a TCP congestion control algorithm or combinations of different TCP congestion control algorithms may be used. Further, a dynamic switching between different congestion control algorithms, e.g. in a scenario-dependent manner, may be implemented.

FIG. 5B shows a method for transmitting data packets by a sending node, in accordance with one or more embodiments of the invention. More specifically, the method of FIG. 5B may be used to send data packets, by the sending node, to the receiving node. The method of FIG. 5B may be repeatedly executed in order to send multiple data packets. The execution of the steps of FIG. 5B may be affected by the execution of the steps of FIG. 5A.

In Step 550, a determination is made about whether the congestion window of the network link associated with the packet acknowledgement obtained in Step 500 allows the transmission of a data packet over the network link. More specifically, a congestion window of a size that is non-zero may allow the transmission of data packets. For example, a congestion window of the size "40" may allow the sending of 40 data portions, i.e., four data packets over the associated network link. The size of the congestion window is controlled as previously described with reference to FIG. 5A.

If a determination is made that the congestion window of the network link allows the sending of a data packet, the method may proceed to Step 552. If the network link does not allow the sending of a data packet, the method may proceed to Step 560.

In Step 552, a determination is made about whether the re-transmit queue contains a data packet. The re-transmit queue may contain a packet if a previously sent packet has been lost. If a data packet exists in the re-transmit queue, the method may directly proceed to Step 558, skipping steps 554 and 556. If the re-transmit queue is found to be empty, the method may proceed to Step 554.

In Step 554, a data flow that is associated with a receive window that allows the sending of data packets is identified. Such a flow may be any flow with data packets available for transmission and a receive window with a size that is non-zero.

In Step 556, a determination is made about whether a data flow has been identified, in Step 554. If no such flow has been identified, the execution of the method may terminate (to repeat with the next execution cycle). If a flow has been identified, the method may proceed to Step 558.

In Step 558, the data packet is sent over the network link. The sent data packet may be a data packet obtained from the re-transmit queue if Step 558 was reached directly from Step 552, or it may be a data packet obtained from a data flow, if Step 558 was reached from Step 556.

Returning to Step 550, if the network link does not allow the sending of a data packet, the method may proceed to Step 560. In Step 560, a determination is made about whether the re-transmit queue contains a data packet. If a data packet exists in the re-transmit queue, the method may directly proceed to Step 564. If the re-transmit queue is found to be empty, the method may proceed to Step 562.

In Step 562, a determination is made about whether the receive window of the data flow associated with the packet acknowledgement obtained in Step 500 allows the transmission of a data packet. More specifically, a receive window of a size that is non-zero may allow the transmission of data packets. For example, a receive window of the size "50" may allow the sending of 50 data portions, i.e., five data packets of the data flow. The size of the receive window is controlled as previously described with reference to FIG. 5A.

If a determination is made that the receive window of the flow sender allows the sending of a data packet, the method may proceed to Step 564. If the receive window of the flow sender does not allow the sending of a data packet (e.g., because the size of the receive window is zero or because there are currently no data packets to be sent), the method may terminate (to repeat with the next execution cycle).

In Step 564, a network link whose congestion window allows the data packet to be sent is identified. Any network link may be a candidate, as long as its associated congestion window can accommodate the data packet.

In Step 566, a determination is made about whether a suitable network link was identified in Step 564. If a network link was identified, the method may proceed to Step 568. If no network link was identified, the method may terminate (to repeat with the next execution cycle).

In Step 568, the data packet of the data flow is sent over the network link, and subsequently the method may return to Step 560.

In the flowchart of FIG. 5B, Steps 550-558 are directed to making use of the available congestion window of the network link for which the acknowledgement was received, by directing data packets from all data flows to the queue controlled by the congestion window. Data packets in the re-transmit queue receive preferential treatment. Further, Steps 560-570 are directed to inspecting the data flow for which the acknowledgement was received and to distribute available data packets of this data flow to network links that are available for transmission. Data packets in the re-transmit queue receive preferential treatment.

FIG. 6 shows a method for receiving data packets by a receiving node, in accordance with one or more embodiments of the invention. The method may repeatedly execute to process data packets as they are received over one or more network links.

In Step 600, a data packet is received by the receiving node.

In Step 602, the link sequence number is extracted from the received data packet. In Step 604, the flow sequence number is extracted from the received data packet. In Step 606, the received data packet is forwarded to the appropriate flow receiver of the receiving node.

In Step 608, an acknowledgement is returned to the sending node. As previously discussed, the acknowledgement includes a link sequence acknowledgement and an optional flow sequence acknowledgement, based on the link sequence number and the flow sequence number extracted from the received data packet.

Embodiments of the invention may be implemented in various ways. In one embodiment of the invention, the single-stream aggregation protocol is implemented using a tunneling approach. The tunnels between the sending node and the receiving node may be provided by various underlying protocols such as, for example, the UDP protocol. Using this approach, none of the network infrastructure components, aside from the sending node and the receiving node, need to be capable of processing the single-stream aggregation protocol. Alternatively, the single-stream aggregation protocol may be implemented without relying on tunnels, e.g., as a transport layer protocol. Such an implementation may attempt to make its communications mimic the appearance of other widely used protocols such as, for example, the TCP protocol, in order to increase the likeliness that the network infrastructure involved in processing these communications is capable of handling them.

Embodiments of the invention may be implemented in software, a combination of software and hardware, and hardware alone. Hardware solutions and partial hardware solutions may be similar to TCP/IP offload engines with the protocol functionalities being partially or entirely implemented in hardware, e.g., on an FPGA or ASIC circuit.

The use case scenarios described below are intended to provide examples for applying the single-stream aggregation protocol in spill-over applications in which multiple network links are used to transmit data. The previously described single-stream aggregation protocol is, however, not limited to spill-over applications, and may be universally applicable to a wide range of communication applications.

Figure 7A:
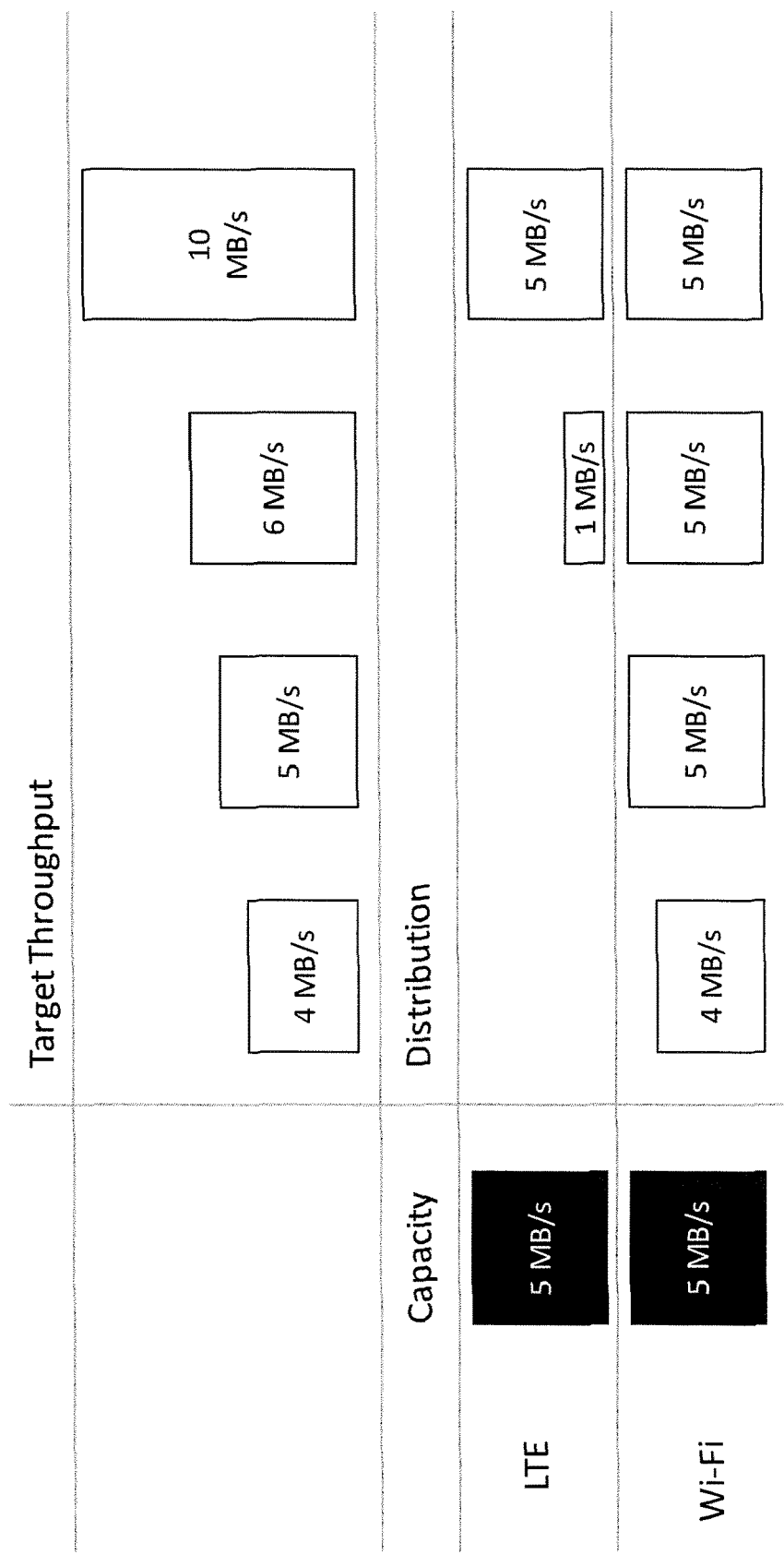

FIG. 7A shows the use of single-stream aggregation protocols for spill-over scheduling, in accordance with one or more embodiments of the invention.

The single-stream aggregation protocol, or more specifically, the algorithm that directs data packets to network links, may be configured to take into account a required overall throughput ("target throughput"). The network links may be throttled as needed to obtain this target throughput. For example, one network link may be relied upon up to its maximum data rate, and if the target throughput exceeds this data rate, additional network links may be used as well.

Consider the exemplary scenarios illustrated in FIG. 7A. Two network links are available for the transmission of data. The first network link is a Wi-Fi network link with a capacity of 5 MB/s, and the second network link is an LTE network link with a capacity of 5 MB/s. Both network links are configured to operate as secondary links, i.e., both network links are only used to the level needed to achieve the desired throughput. Assume that the scheduler, previously introduced with reference to FIG. 2 is configured to primarily rely on the Wi-Fi network link, and to use the LTE network link only if the target throughput exceeds the capacity of the Wi-Fi network link.

In a first scenario, the target throughput is set to 4 MB/s. The Wi-Fi network link alone is fast enough to send data at this rate, and accordingly, the LTE network link is not used. Because the Wi-Fi network link is configured as secondary network link, it is limited to operate at a 4 MB/s throughput.

In a second scenario, the target throughput is raised to 5 MB/s. The Wi-Fi network link is still sufficient, and accordingly, the LTE network link is still not used. In a third scenario, the target throughput is raised to 6 MB/s. The Wi-Fi network link is no longer sufficient to provide the necessary throughput, and accordingly, the LTE network link is used as well. The LTE network link contributes 1 MB/s to reach a 6 MB/s data rate. In a fourth scenario, the target throughput is raised to 10 MB/s, which results in both the Wi-Fi and the LTE network links operating at 5 MB/s. For any target throughputs beyond 10 MB/s, the same result would be obtained because both network links are saturated.

Figure 7B:
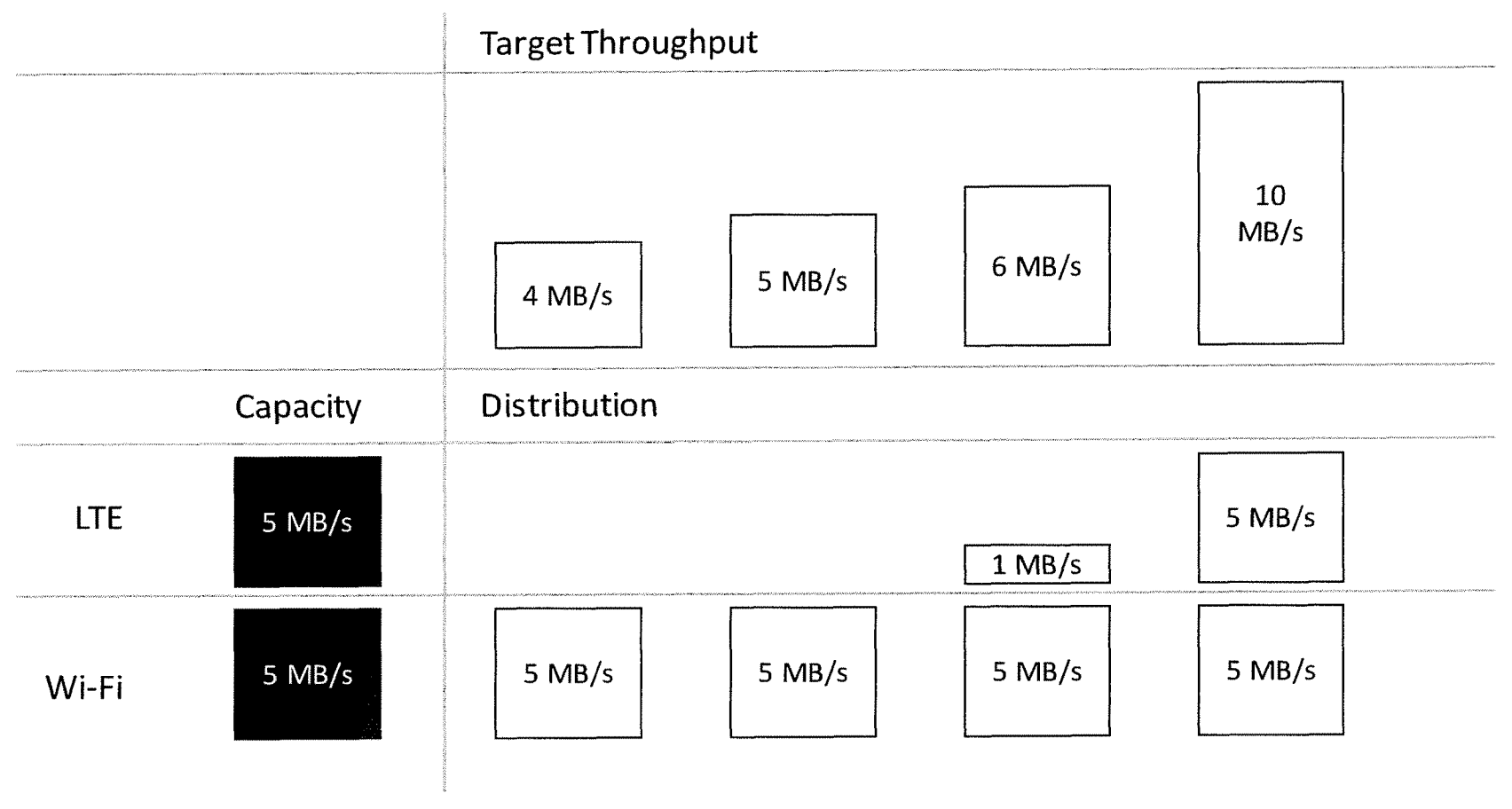

FIG. 7B shows the use of single-stream aggregation protocols for spill-over scheduling, in accordance with one or more embodiments of the invention. Similar to the scenarios in FIG. 7A, two network links are available for the transmission of data. The first network link is a Wi-Fi network link with a capacity of 5 MB/s, and the second network link is an LTE network link with a capacity of 5 MB/s. In FIG. 7B, the Wi-Fi network link is configured to operate as a primary link, whereas the LTE network link is configured to operate as a secondary link. Accordingly, the Wi-Fi network link is always operated at its available capacity of 5 MB/s, whereas the LTE network link is only used to the level needed to achieve the desired throughput. The scheduler is configured to primarily rely on the Wi-Fi network link, and to use the LTE network link only if the target throughput exceeds the capacity of the Wi-Fi network link.

Similar to the scenarios described with reference to FIG. 7A, the scenarios shown in FIG. 7B require target throughputs of 4, 5, 6, and 10 MB/s. However, unlike the scenarios of FIG. 7A, in FIG. 7B, in all scenarios, the full available capacity of 5 MB/s of the Wi-Fi network link is always used, whereas only the additionally necessary needed capacity is used for the LTE network link.

Generalizing the scenarios of FIGS. 7A and 7B, the scheduler may be configured to operate zero, one, or multiple primary network links which are always fully used and/or a selection of secondary networks which may be used in a configurable order. Secondary links may be added to the pool of network links as needed to obtain the target throughput rate.

This functionality of the scheduler enables the optimized usage of low-cost bandwidth (e.g. Wi-Fi) and costly bandwidth (e.g. LTE). The usage of the costly network links may be limited to the bandwidth that is necessary to obtain the target throughput rate. When low-cost (and potentially unlimited) network links provide the necessary bandwidth, the costly network links may not be used. However, when the low-cost network links do not have sufficient capacity to achieve the target throughput, the costly network links may be relied upon as needed.

It may further be possible to configure the scheduler to always treat the first secondary link as unlimited ("primary"), in case there are no other primary links available. This allows a device to fully use the unlimited network, use costly networks to a limited degree only to help achieve the target throughput, while not limiting the use of the costly network (like LTE) if it is the only network available. The behavior of the scheduler may be dynamically configured and changed.

The above scenarios have in common that they are based on traffic that, without imposing a data rate limit, would have been able to saturate the available network links. An example for such traffic is a download from a fast server. Spill-over scheduling may, however, also be applied to scenarios that require the transmission of data in chunks, sent over specific time intervals, such as it may be necessary for video-streaming. In such scenarios, the spill-over scheduling may enable data streaming at a desired rate over multiple network links, mostly using low-cost network links and relying on costlier network links only when necessary.

Figure 8A:
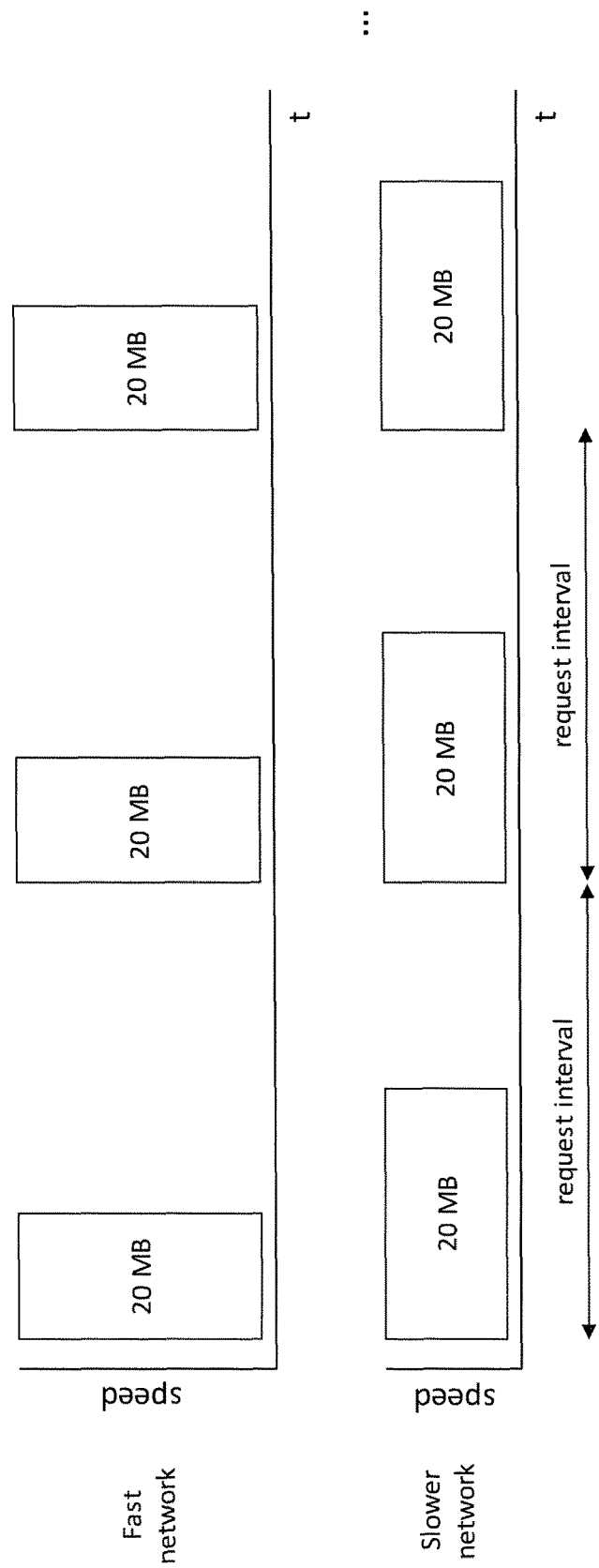
FIGS. 8A and 8B shows the use of single-stream aggregation protocols for spill-over scheduling in data streaming applications, in accordance with one or more embodiments of the invention.

FIG. 8A shows exemplary data transfers made by a video streamer downloading video chunks, 20 MB each, over some time intervals. Both presented networks, the fast network (top half of the chart) and the slow network (bottom half of the chart) are sufficiently fast to support the selected video rate because they are both capable of transferring a single 20 MB chunk of data within the time limits of a request interval. However, the faster network sends the entire chunk in less time, and stays idle longer (before the beginning of the next time interval), in comparison to the slower network. Because the transmission of data chunks is timed, regardless of how much more throughput is available over the network, a subsequent data chunk is transferred at the beginning of the next request interval. In a hypothetical scenario in which the network's speed matched the bitrate of the video stream, there would be no idle time between the chunks. Further, if the network was too slow, the streamer would have to select a stream with a lower bitrate, and transfer, for example, only 10 MB over the same time interval.

Figure 8B:
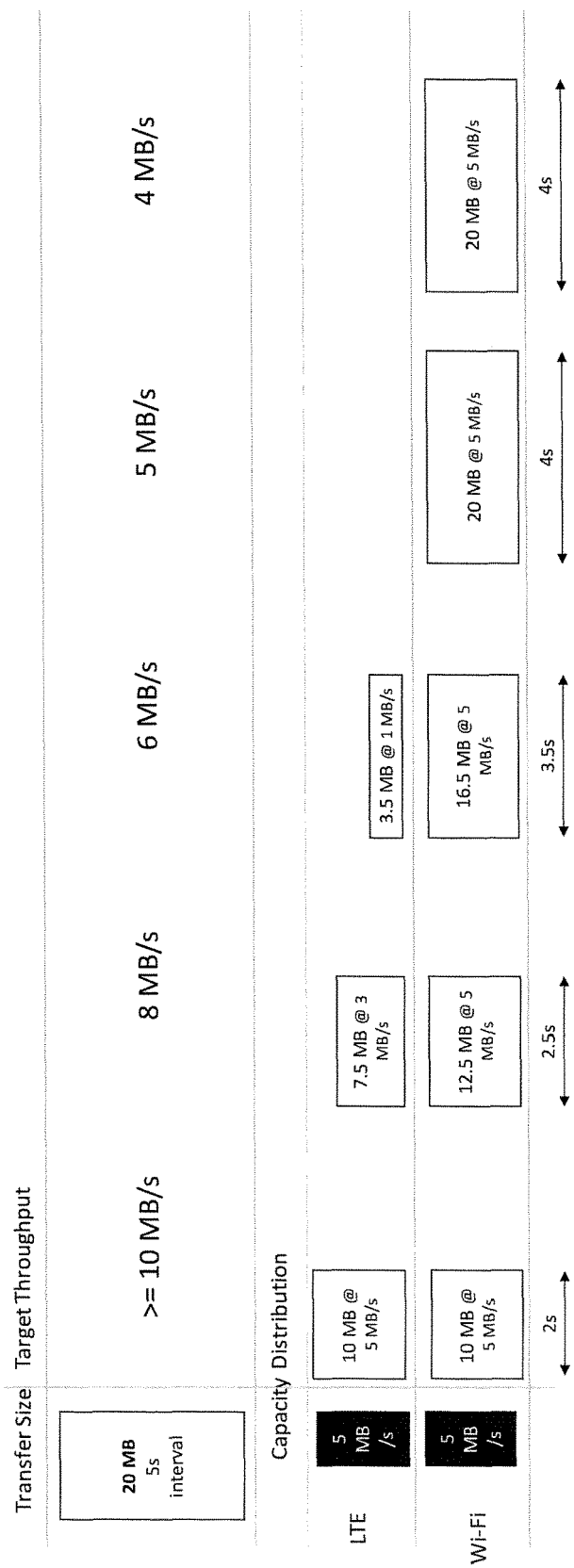

FIG. 8B shows exemplary data transfers made by a video streamer over one or two network links. 20 MB are to be transmitted in 5 second time intervals. The target throughput of the two-link connection may be configurable. For higher target throughputs, both network links may be required, whereas for lower target throughputs, use of a single network link may be sufficient. The network links are a "high cost" LTE link and a "low cost" Wi-Fi link. Accordingly, the Wi-Fi link is preferred for the data transmissions.

In the first scenario, the target throughput is set to 10 MB/s or more, and a transfer rate of 10 MB/s is obtained, with both network links being maximally used. The 20 MB video data chunk is, thus, transmitted at 5 MB/s over each of the network links, and the total transfer time is 2 seconds. 3 seconds of idle time remain until the 5 second time limit is reached.

In the second scenario, the target throughput is set to 8 MB/s. The resulting traffic distribution is as follows: Because the Wi-Fi network link provides a 5 MB/s transfer rate, the LTE network link needs to provide an additional 3 MB/s only. Accordingly, 7.5 MB of data are transferred over the LTE network link, whereas 12.5 MB of data are transferred over the Wi-Fi network link. The total time required for the transmission is 2.5 seconds.

When further lowering the target throughput, more data are sent over Wi-Fi and less over mobile. For example, in a third scenario, 3.5 MB of data are transferred over the LTE network link, whereas 16.5 MB of data are transferred over the Wi-Fi network link.

In the fourth scenario in which the target throughput is set to 5 MB/s, the LTE network link is not used at all, and all data are sent over the Wi-Fi network link. The duration of the transmission is 4 seconds.

In the fifth scenario, the target throughput is set to 4 MB/s. The LTE network link is not used at all, and all data are sent over the Wi-Fi network link. Because the Wi-Fi network link is configured as a primary network link, the duration of the transmission is 4 seconds. Further lowering the target throughput has no effect. In contrast, assuming that the Wi-Fi network link was configured as a secondary network link, setting the target throughput to 4 MB/s would result in a 20 MB video data chunk being sent in 5 seconds rather than 4 seconds.

The above scenarios have in common that a single network link would have been sufficient to transfer the streaming data within the allowable time windows. However, when requiring higher data rates, e.g., 30 MB of data every 5 seconds, both networks links are needed. The target throughput would have to be set to a minimum of 6 MB/s, with 25 MB of data sent over the Wi-Fi network link, and 5 MB of data over the LTE network link. This configuration would allow for the delivery of, for example, higher quality video than over the Wi-Fi network link alone, while only using the potentially costly LTE network link as necessary.

In practice, due to varying network conditions, throughputs and limits are rarely precise. It may, thus, be reasonable to set the target throughput slightly higher than theoretically needed to ensure reliable transmission, even in presence of, for example, occasionally dropped data packets.

The described spill-over scheduling may be accomplished in various ways. In one or more embodiments of the invention, the scheduler, previously discussed with reference to FIG. 2, monitors actual data throughput over the network links, re-adjusts throughput limits on secondary network links to minimize their usage to satisfy configured target throughput requirement without excessively using the secondary network links. If primary (unlimited) links are sufficiently fast, secondary links may be limited to zero throughput, i.e., no data packets are transmitted over these secondary links.

In one embodiment of the invention, the throughput monitoring and rate limiting tracks the actual data being sent, and may perform traditional rate limiting. Alternatively, current data throughput over the network links may be estimated by inspecting congestion control windows and known network link latencies. Note that this approach estimates the current maximum allowed throughput over the network link, rather than the actual amount of data being sent. This estimated throughput may be particularly useful for the operation of a spill-over mechanism. Alternatively, the actual amount of data being sent over the network links may be metered.

A throughput limit may be enforced using a separate rate control mechanism, or by adjusting the congestion window size limit as needed.

Using these rate control mechanisms, secondary links may be limited to a desired data rate, they may not be limited, or alternatively a combination of limited and unlimited data links may be used. The configuration of the rate control mechanisms may be dynamically adjusted as necessary or desired.

Figure 9:
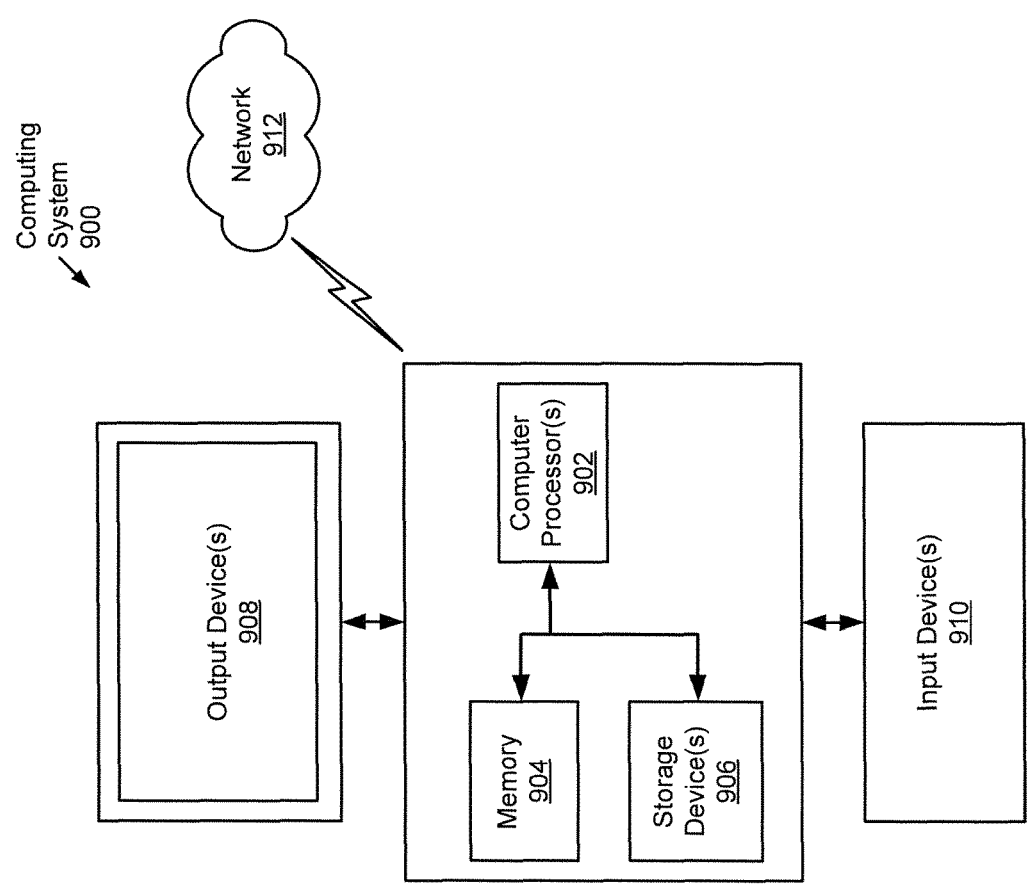
FIG. 9 shows a computing system, in accordance with one or more embodiments of the invention.

FIG. 9 shows a computing system in accordance with one or more embodiments of the invention. Embodiments of the invention may be implemented on a computing system. Any combination of mobile, desktop, server, embedded, or other types of hardware may be used. For example, as shown in FIG. 9, the computing system (900) may include one or more computer processor(s) (902), associated memory (904) (e.g., random access memory (RAM), cache memory, flash memory, etc.), one or more storage device(s) (906) (e.g., a hard disk, an optical drive such as a compact disk (CD) drive or digital versatile disk (DVD) drive, a flash memory stick, etc.), and numerous other elements and functionalities. The computer processor(s) (902) may be an integrated circuit for processing instructions. For example, the computer processor(s) may be one or more cores, or micro-cores of a processor. The computing system (900) may also include one or more input device(s) (910), such as a touchscreen, keyboard, mouse, microphone, touchpad, electronic pen, or any other type of input device. Further, the computing system (900) may include one or more output device(s) (908), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (900) may be connected to a network (912) (e.g., a local area network (LAN), a wide area network (WAN) such as the Internet, mobile network, or any other type of network) via a network interface connection (not shown). The input and output device(s) may be locally or remotely (e.g., via the network (912)) connected to the computer processor(s) (902), memory (904), and storage device(s) (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the invention.

Further, one or more elements of the aforementioned computing system (900) may be located at a remote location and connected to the other elements over a network (912). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Various embodiments of the invention have one or more of the following advantages. Embodiments of the invention enable one or more flow senders to communicate over one or more network links. The use of flow-specific flow sequence numbers and link-specific link sequence numbers provides various advantages. A data packet, at any time, may be uniquely associated with a particular flow. When a data packet is lost, the sending node may, thus, identify to which flow a lost packet belongs. Accordingly, only the lost data packet may be re-transmitted, while avoiding the unnecessary re-transmission of other data packets. Further, due to the elimination of ambiguities regarding which data packet triggered a particular acknowledgement, round trip time can be accurately measured.

Embodiments of the invention further enable the efficient usage of the available capacity of multiple network links by multiple data flows, even if these network links have different capacities, due to the separation of the flow-specific receive window control and the link-specific congestion control. If a re-transmit becomes necessary, the re-transmit may be performed over any available network link. Flow sequence numbers that are flow specific are used to enable restoration of the original order of data packets on the receiving node side. Because data flows are controlled using flow-specific receive windows, slower data flows (e.g., resulting from slower flow receivers) do not impair other data flows.

Embodiments of the invention may further be used to implement spill-over scheduling that may enable cost-effective use of available network link capacity while ensuring that the capacity necessary to accommodate one or more data flows is available.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A data transmission system, comprising:
  a sending node, comprising:
    a first link queue, configured to store data packets to be transmitted to a receiving node on a first network link;
    a first link-specific congestion control, associated with the first link queue, the first link-specific congestion control configured to control a first congestion window,
      wherein the first congestion window, controlled based on an available capacity of the first network link, determines a size of the first link queue for the data packets to be transmitted;
    a plurality of flow senders, configured to transmit data packets of a plurality of data flows to flow receivers on the receiving node;
    a plurality of flow-specific receive window controls, independent from the first link-specific congestion control,
      wherein exactly one flow-specific receive window control is associated with each data flow of the plurality of data flows,
      wherein each flow-specific receive window control controls a receive window of the associated flow sender based on an available capacity of the corresponding flow receiver to specify an amount of data available to be entered into the first link queue;
    a second link queue configured to store data packets to be transmitted to the receiving node on a second network link; and
    a second link-specific congestion control is associated with the second link queue, the second link-specific congestion control being configured to control a second congestion window,
      wherein the second congestion window is controlled based on an available capacity of the second network link and determines a size of the second link queue for the data packets to be transmitted, and
      wherein data, made available by one of the plurality of flow senders, are made available to one selected from a group consisting of the first network link and the second network link to the flow receivers on the receiving node.

2. The data transmission system of claim 1, wherein for the data, made available by one of the plurality of flow senders, the second network link is selected for the transmission of at least one data packet comprising the data based on the available capacity of the second network link.

3. The data transmission system of claim 1, wherein the first network link and the second network link have different data transmission capacities.

4. The data transmission system of claim 1, wherein the first network link and the second network link are selected from a group consisting of a wireless local area network and a cellular network.

5. The data transmission system of claim 1, configured to perform spill-over scheduling,
  wherein the first network link is configured to serve as a primary network link for data transmissions, and
  wherein the second network link is configured to serve as a secondary network link for the data transmissions, for a part of the data transmissions that exceeds the available capacity of the first network link.

6. The data transmission system of claim 5, wherein the first and the second congestion windows are used to distribute the data transmissions of the first and the second network links.

7. The data transmission system of claim 1, further comprising a re-transmit queue, configured to store data packets that require re-transmission to the receiving node,
  wherein a data packet in the re-transmit queue has priority over data packets in the first link queue.

8. The data transmission system of claim 7, wherein the re-transmission queue is not flow-specific and not link specific.

9. The data transmission system of claim 1, further comprising the receiving node, wherein the receiving node is configured to operate as an aggregation server between the sending node and a network.

10. The data transmission system of claim 9, wherein the sending node is configured to operate as an aggregation client, hosted on a router to serve a plurality of devices connecting to the router.

11. A method for transmitting data by a sending node, the method comprising
  setting a first link-specific congestion control associated with a first link queue, comprising:
    controlling a size of the first link queue associated with a first network link between the sending node and a receiving node, by setting a first congestion window based on an available capacity of the first network link, wherein the first link queue is configured to store data packets to be transmitted from the sending node to the receiving node;

setting a plurality of flow-specific receive window controls that are independent from the link-specific congestion control, comprising:

for each of the plurality of flow-specific receive window controls, controlling a receive window of an associated flow sender of the sending node based on an available capacity of a corresponding flow receiver of the receiving node, wherein the flow-specific receive window specifies an amount of data available to be entered into the first link queue for transmission to the receiving node; and setting a second link-specific congestion control associated with a second link queue, wherein setting the second link-specified congestion control comprises:

controlling a size of the second link queue associated with a second network link between the sending node and the receiving node, by setting a second congestion window based on an available capacity of the second network link, wherein the second link queue is configured to store the data packets to be transmitted from the sending node to the receiving node, and wherein data, made available by one of the plurality of flow senders, are made available to one selected from a group consisting of the first network link and the second network link.

12. The method of claim 11, wherein the data are made available by the flow sender based on the data being within the range of the receive window of the flow sender.

13. The method of claim 11, further comprising:

entering at least one data packet comprising the available data into the second link queue based on a determination that the second congestion window allows the sending of the at least one data packet; and sending the at least one data packet in the second link queue over the second network link.

14. The method of claim 13, further comprising, prior to entering the available data into the second link queue:

making a determination that a data packet exists in a re-transmit queue of the sending node; and sending the data packet in the re-transmit queue over the second network link.

15. The method of claim 11, further comprising:

making a first determination that the second congestion window does not allow the sending of the data;

making a second determination that the first congestion window does allow the sending of the data;

sending at least one data packet comprising the data over the first network link, based on the second determination.

16. The method of claim 15, further comprising, after making the first determination and prior to making the second determination:

making a third determination that a data packet exists in a re-transmit queue of the sending node; and sending the data packet in the re-transmit queue over the first network link.

17. The method of claim 11, further comprising implementing spill-over scheduling, with the first network link being configured as a primary network link for data transmissions, and the second network link being configured as a secondary network link for a part of the data transmissions that exceeds the available capacity of the first network link, wherein the second congestion window is set to zero, thereby preventing data transmissions over the second network link, unless all available capacity of the first network link is used.

18. The method of claim 11, further comprising:

receiving a network link acknowledgement for a received data packet from the receiving node; and removing the acknowledged data packet from the first link queue.

19. The method of claim 11, wherein the available capacity of the corresponding flow receiver is determined based on an available flow receiver buffer of the flow receiver.

20. The method of claim 18, further comprising adjusting the first congestion window using a congestion control algorithm.

21. The method of claim 11, further comprising:

making a determination that a non-acknowledged packet was lost, and based on the determination, moving the non-acknowledged packet from the first link queue to a re-transmit queue.

* * * * *